United States Patent [19]

Sounik et al.

[11] Patent Number: 5,087,390
[45] Date of Patent: Feb. 11, 1992

[54] TETRAAZAPORPHYRIN DYE MIXTURES

[75] Inventors: James R. Sounik, Somerset; Jacquelyn Popolo, Bergen, both of N.J.

[73] Assignee: Hoechst Celanese Corp., Somerville, N.J.

[21] Appl. No.: 333,523

[22] Filed: Apr. 4, 1989

[51] Int. Cl.[5] .................... F21V 9/04; G03C 1/00; C09B 47/04; C09B 62/00
[52] U.S. Cl. .................... 252/587; 430/495; 430/944; 540/122; 540/136; 540/139; 540/140
[58] Field of Search .......... 252/582, 587, 588, 589; 540/122, 123, 139, 140, 136; 430/495, 496, 444

[56] References Cited

U.S. PATENT DOCUMENTS

| | | | |
|---|---|---|---|
| 4,061,654 | 12/1977 | Idelson | 540/122 |
| 4,622,179 | 11/1986 | Eda | 540/139 |
| 4,725,525 | 2/1988 | Kenney et al. | 430/270 |
| 4,749,637 | 6/1988 | Hayashida et al. | 430/58 |
| 4,769,307 | 9/1988 | Ozawa et al. | 540/139 |
| 4,783,386 | 11/1988 | Nikles et al. | 252/582 |
| 4,814,256 | 3/1989 | Aldag et al. | 540/122 |
| 4,828,758 | 5/1989 | Gillberg-LaForce | 252/582 |
| 4,943,681 | 7/1990 | Sato et al. | 430/495 |

FOREIGN PATENT DOCUMENTS 3711762 10/1988 Fed. Rep. of Germany ...... 540/139

*Primary Examiner*—John S. Maples
*Assistant Examiner*—Philip Tucker
*Attorney, Agent, or Firm*—P. S. Kalyanaraman

[57] ABSTRACT

In one embodiment this invention provides a tetraazaporphyrin dye mixture which exhibits light absorption over a spectrum range of about 660–850 nm, and provides a process for production of the dye mixture.

An invention dye mixture has utility in optical recording media, or as a nonlinear optical component in optical light switch or light modulator devices.

Illustrative of an invention dye mixture is a blend of dye constituents respectively having varying combinations of phthalocyanine and naphthalocyanine entities in the macrocyclic structures.

6 Claims, 2 Drawing Sheets

TETRAAZAPORPHYRIN DYE MIXTURES

CROSS-REFERENCE TO RELATED APPLICATION

The subject matter of this patent application is related to that disclosed in patent application Ser. No. 07/183077, filed Apr. 19, 1988 now U.S. Pat. No. 4854676.

BACKGROUND OF THE INVENTION

Porphyrins and tetraazaporphyrin are organic materials which have utility in a broad range of applications, such as pigments, laser dyes, photoconductors, optical recording media, and the like.

U.S. Pat. Nos. 4,061,654; 4,622,179; 4,731,312; 4,749,637; 4,766,054; 4,719,613; and 4,725,525 describe novel phthalocyanine and naphthalocyanine type dyes which are adapted for application in optical recording systems.

U.S. Pat. No. 4,622,174 describes metallo-porphyrin complexes which are proposed for application in transparent protective laser shields.

U.S. Pat. No. 4,657,554 describes water-soluble azaphthalocyanines which are useful as photoactivators in textile bleaching operations.

J. Am. Chem. Soc., 106, 7404(1984) by Wheeler et al describes the synthesis and characterization of bis(tri-n-hexylsiloxy)(2,3-phthalocyaninato)silicon and its dimer.

Poly. Prepr. Am. Soc., Div. Polym. Chem.) by Moyer et al describes the synthesis of monomeric silicon naphthalocyanine, and conducting cofacial polymers derived from the monomer.

German Offenlegungsschrift 37-11-762-A1 published Oct. 27, 1988 is a particularly pertinent disclosure which describes mixed phthalo-naphthalocyanines and thin radiation-sensitive films containing these compounds.

There is a continuing interest in the development of new and improved porphyrin and tetraazaporphyrin type structures for specialized applications deriving from unique physicochemical and optical properties.

Accordingly, it is an object of this invention to provide tetraazapophyrin compositions which exhibit a novel combination of optical properties, and provide process embodiments for their production.

It is another object of this invention to provide thin film optical media which exhibit a broad range of light absorption capability.

It is a further object of this invention to provide optical light switch and light modulator devices with a novel nonlinear optical component comprising a thin film of a tetrazaapophyrin composition.

Other objects and advantages of the present invention shall become apparent from the accompanying description and examples.

DESCRIPTION OF THE INVENTION

Figure 1:
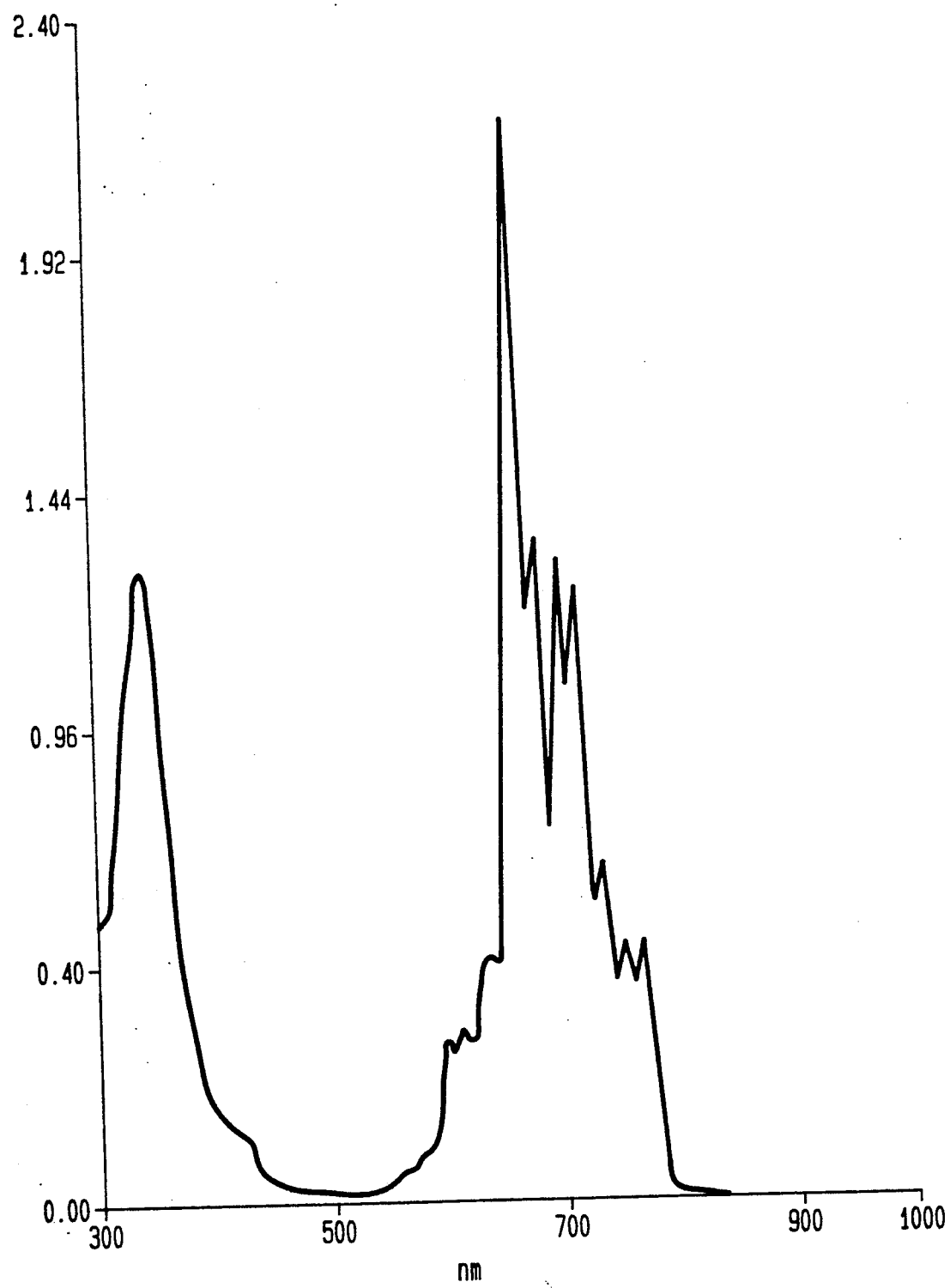
FIGS. 1 and 2 show the UV-VIS-NIR SPECTRUM OF COMPOUNDS ACCORDING TO THE PRESENT INVENTION.

One or more objects of the present invention are accomplished by the provision of a mixture of tetraazaporphyrin dyes which exhibits light absorption over a spectrum range of about 660-850 nm.

For many applications an invention tetraazaporphyrin dye mixture is in the form of a thin film optical medium.

A thin film optical medium can consist of the tetraazaporphyrin dye mixture alone, or in combination with other constituents such as a polymeric matrix. A dye mixture can be formed into a homogeneous blend with a polymer such as polyacrylate, polyurethane, polyester, polyvinyl halide, polyamide, polyether, polysiloxane, polyacrylamide, polyvinylpyrrolidone, polyvinyl polymers with pendant side chains that exhibit nonlinear optical response, and the like.

A dye/polymer blend can be prepared by admixing powders of the dye mixture and the polymer and heating the admixture until a homogeneous melt phase is formed. The melt phase can be compressed or molded into suitable shaped bodies. Preferably, the dye mixture constitutes between about 40-95 weight percent of the blended product.

An invention tetraazaporphyrin mixture is soluble in a wide variety of organic solvents, such as tetrahydrofuran, benzene, pyridine, quinoline, dimethylformide, chloroform, and the like. A solution of an invention tetraazaporhyrin mixture can be cast, sprayed or spin-coated to form thin films on substrates such as optical glass.

A present invention tetraazaporphyrin dye mixture typically will be comprised of substituted or unsubstituted phthalocyanine, naphthalocyanine or phthalo/naphthalocyanine structures; or substituted or unsubstituted phthalocyanine, anthracyanine and phthalo/anthracyanine structures; or substituted or unsubstituted naphthalocyanine, anthracyanine and naphthalo/anthracyanine structures, or substituted or unsubstituted phthalocyanine, naphthalocyanine, anthracyanine and phthalo/naphthalo/anthracyanine structures; or the like.

A present invention tetraazaporphyrin mixture in the form of an optical medium can have an external field-induced noncentrosymmetric molecular orientation, and exhibit second order nonlinear optical susceptibility.

The term "external field" as employed herein refers to an electric, magnetic or mechanical stress field which is applied to a substrate of mobile organic molecules, to induce dipolar alignment of the molecules parallel to the field.

In another embodiment this invention provides a thin film optical medium comprising a mixture of tetraazaporphyrin dye constituents which exhibits light absorption over a spectrum range of about 660-850 nm, and which dye constituents have different structures respectively corresponding to the formula:

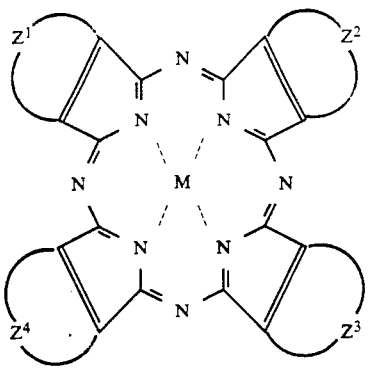

where M is a coordinated silicon or metal containing group; and $Z^1$, $Z^2$, $Z^3$ and $Z^4$ individually are one of the following structures:

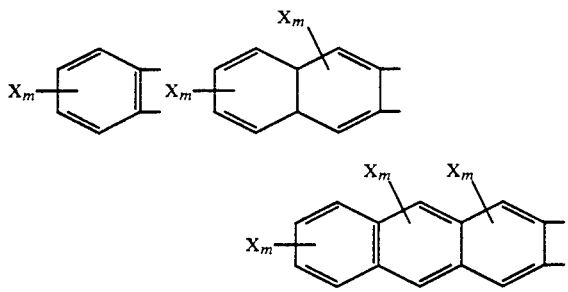

where X is hydrogen, halogen or an aliphatic, alicyclic or aromatic substituent containing 1-12 carbon atoms, and m is an integer with a value of 1-2.

The M coordinated group can contain an element such as Si, Cu, Mg, Ca, Sr, Zn, Cd, Al, Ga, In, Tl, Ge, Sn, Pb, Ti, Sb, Bi, V, Nb, Ta, Se, Te, Cr, Mo, W, Mn, Tc, Fe, Co, Ni, Ru, Pd, Os, Sr, Pt, and the like. The M group can be in the form of an oxide, halide, siloxy, metalorgano, or the like.

Illustrative of a dye mixture corresponding to the above represented formula is a blend wherein in one dye constituent $Z^1$, $Z^2$, $Z^3$ and $Z^4$ are each a benzo structure; in another dye constituent $Z^1$, $Z^2$ and $Z^3$ are each a benzo structure, and $Z^4$ is a naphthalo structure; in another dye constituent $Z^1$ and $Z^2$ are each a benzo structure, and $Z^3$ and $Z^4$ are each a naphthalo structure; in another dye constituent $Z^1$ and $Z^3$ are each a benzo structure, and $Z^2$ and $Z^4$ are each a naphthalo structure; in another dye constituent $Z^1$ is a benzo structure, and $Z^2$, $Z^3$ and $Z^4$ are each a naphthalo structure; and in another dye constituent $Z^1$, $Z^2$, $Z^3$ and $Z^4$ are each a naphthalo structure.

The X substituent in the above represented formulae can be hydrogen, chloro, bromo, fluoro, trimethylsilyl, methyl, isobutyl, hexyl, butenyl, methoxy, cyclohexyl, pyridyl, phenyl, tolyl, and the like.

In another embodiment this invention provides an optical recording system having a recording medium component which consists of a thin film comprising a mixture of tetraazaporphyrin dyes which exhibits light absorption over a spectrum range of about 660-850 nm.

In a preferred embodiment the thin film of the recording system is comprised of a mixture of dye constituents which have different structures respectively corresponding to the formula:

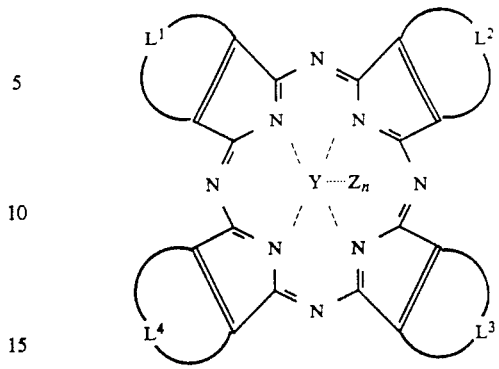

where Y is a silicon, germanium, vanadium, tin, aluminum, gallium, indium, titanium, zirconium or hafnium atom; Z is halogen, hydroxyl, oxido, siloxy or an aliphatic, alicyclic or aromatic substituent containing 1-12 carbon atoms; n is an integer with a value of 0-2; and $L^1$, $L^2$, $L^3$ and $L^4$ individually are benzo or naphthalo structures.

In another embodiment this invention provides an optical light switch or light modulator device with a nonlinear optical component which is a thin film comprising a mixture of tetraazaporphyrin dyes which exhibits light absorption over a spectrum range of about 660-850 nm.

A typical nonlinear optical thin film component in an invention device will exhibit third order nonlinear optical susceptibility $X^{(3)}$. In a preferred embodiment the nonlinear optical thin film component has an external field-induced noncentrosymmetric molecular orientation, and exhibits second order nonlinear optical susceptibility $X^{(2)}$.

A present invention tetraazaporphyrin mixture optical medium exhibits bistable states of light transmission, and can be utilized as a saturable absorber component in the etalon cavity of a Fabry-Perot resonator.

Preparation Of Tetraazaporphyrin Mixtures

In another embodiment this invention provides a process for producing a mixture of tetraazaporphyrin dyes which exhibits light absorption over a spectrum range of about 660-850 nm, which comprises reacting a 1,3-diiminoisoindoline compound with a 1,3-diiminobenz[f]isoindoline compound in a solvent medium.

In the practice of the process, the 1,3-diiminoisoindoline reactant is utilized in a quantity between about 0.3-1.5 moles per mole of 1,3-diiminobenz[f]isoindoline reactant, and the reaction is conducted at a temperature in the range between about 40°-250° C.

In another embodiment this invention provides a process for producing a mixture of tetraazaporphyrin dyes which exhibits light absorption over a spectrum range of about 660-850 nm, which comprises reacting 1,3-diiminoisoindoline with 1,3-diiminobenz[f]isoindoline in a molar ratio of about 0.5-1.5:1 at a temperature in the range between about 40°-250° C. in a solvent medium containing a metallizing reagent, wherein the dye constituents of the product mixture have different structures respectively corresponding to the formula:

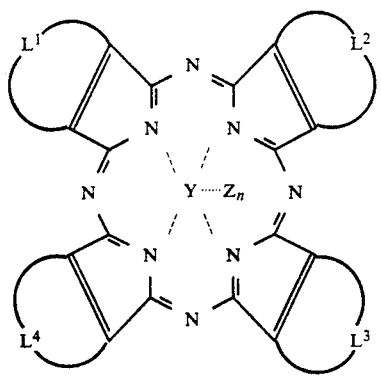

where Y is a silicon, germanium, vanadium, tin, aluminum, gallium, indium, titanium, zirconium or hafnium atom; Z is halogen, hydroxyl, oxido, siloxy or an aliphatic, alicyclic or aromatic substituent containing 1–12 carbon atoms; n is an integer with a value of 0–2; and $L^1$, $L^2$, $L^3$ and $L^4$ individually are benzo or naphthalo structures.

A dye mixture produced by the reaction of 1,3-diiminoisoindoline with 1,3-diiminobenz[f]isoindoline and a metallizing reagent is composed of six different macrocyclic compounds corresponding to the following structures:

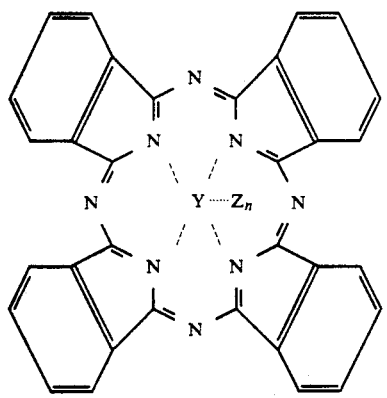

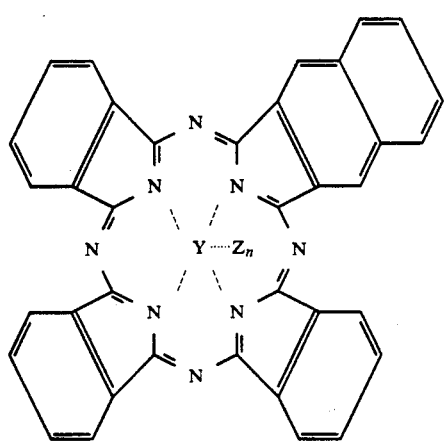

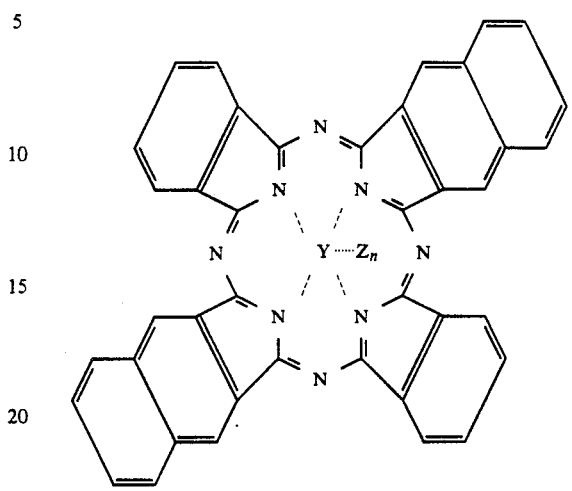

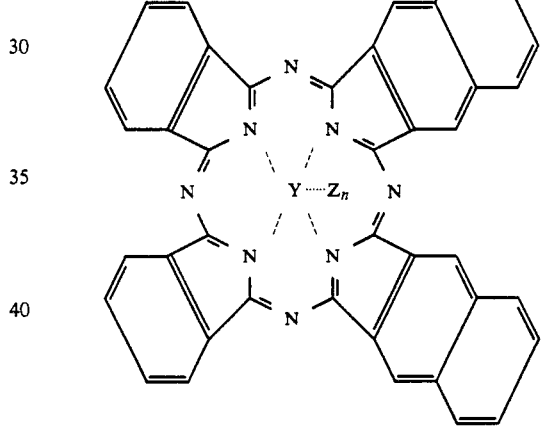

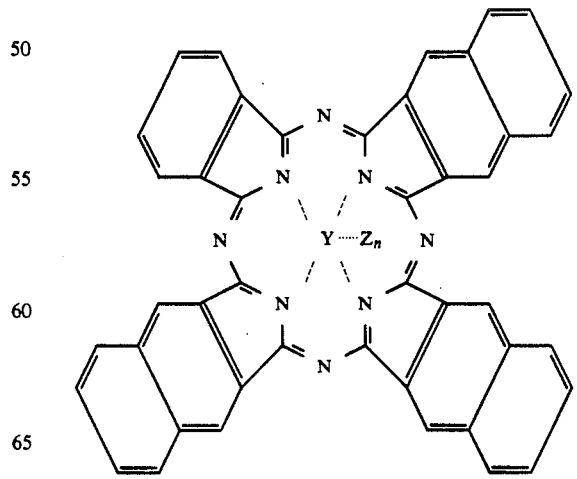

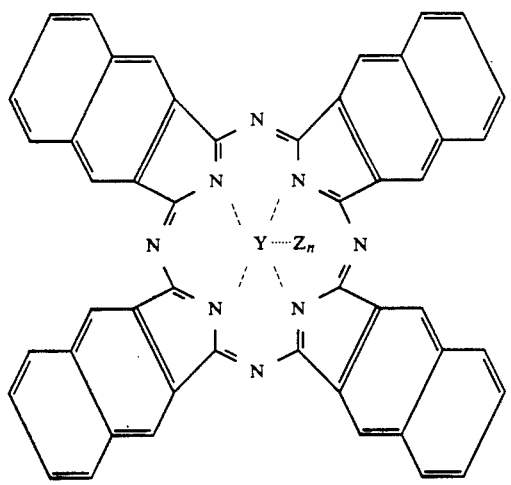

The solvent medium normally will be an organic solvent such as tetrahydrofuran, quinoline or pyridine, and a typical metallizing reagent is silicon tetrachloride. Depending on the selected reactants and reaction conditions, the reaction period normally will vary in the range between about 0.5-5 hours.

After the reaction period is completed, the dye product can be separated by precipitating the product from solution by cooling and/or by the addition of a diluent such as methanol. The crystalline dye product can be redissolved in a solvent for the preparation of thin film coatings on selected substrates.

The following examples are further illustrative of the present invention. The components and specific ingredients are presented as being typical, and various modifications can be derived in view of the foregoing disclosure within the scope of the invention.

EXAMPLE I

This Example illustrates the preparation of phthalo/-naphthalocyanine dye mixtures with a 1:1 mole ratio of isoindoline reactants in accordance with the present invention.

A. Dichlorosilicon benzophthalocyanine

A mixture of 1,3-diiminoisoindoline (3.528 g, 24.11 mmoles), 1,3-diiminobenz(f)isoindoline (4.732 g, 24.11 mmoles), silicon tetrachloride (2.76 ml, 24.11 mmole) and azeotropically distilled quinoline (100 ml) is refluxed for 1.5 hours. The resultant suspension is cooled to room temperature, and the solid phase is separated by filtration, washed with methanol, and vacuum dried at room temperature for 14 hours. The solid product (5.471 g) has a blue-green color, and gives a positive Beilstein test for halogen.

B. Dihydroxysilicon benzophthalocyanine

A mixture of dichlorosilicon benzophthalocyanine (5.471 g) and concentrated sulfuric acid (50 ml) is stirred at room temperature for 3 hours. The reaction solution is poured onto ice, and the resulting suspension is filtered to separate the solid product. The product is washed with water, and vacuum dried at room temperature for 14 hours.

The solid product is admixed with pyridine (50 ml) and concentrated ammonium hydroxide (5 ml), and the admixture is refluxed for one hour. The resulting reaction medium suspension is filtered, and the separated solid product is washed with methanol, and vacuum dried at room temperature for 14 hours. The product (5.361 g) is a bright blue-green solid which gives a negative Beilstein test for halogen.

C. Bis(dimethyloctadecylsiloxy)silicon benzophthalocyanine

A mixture of dihydroxysilicon benzophthalocyanine (5.0 g), dimethyloctadecylchlorosilane (7.26 g) (Aldrich Chemical Company), tributylamine (5 ml) and azeotropically distilled 3-picoline (100 ml) is refluxed for 4 hours. The reaction medium is filtered hot (medium frit), and the filtrate is concentrated under reduced pressure.

The liquid concentrate is diluted with ethanol/water (1:1), and the formed suspension is filtered to isolate the solid phase. The solid is washed with ethanol and vacuum dried at room temperature for 14 hours to yield 5.502 g of product.

A portion (1.036 g) of the solid product is purified by column chromatography (alumina III, wet loaded, hexanes-toluene 4:1). The purified product (279 mg) is a bright blue-green solid which is soluble in chloroform, methylene chloride, and toluene, and is slightly soluble in hexanes and acetone.

FIG. 1 is a UV-VIS-NIR spectrum of the bis(dimethyloctadecylsiloxy)silicon benzophthalocyanine product (1:1 mole ratio).

Table I summarizes a NMR spectrum of the preferred product.

NMR (200 MHz, $C_6D_5CD_3$) 10.26, 10.24, 10.20, 10.19 (Nap-H), 9.77 (Ph-H), 8.35 (Nap-H), 8.01 (Ph-H), 7.62 (Nap-H), −2.10 (O-Ph; 4-Nap, Si-CH$_3$), −2.20 (1-Ph; 3-Nap, SiCH$_3$), −2.31 (2-Ph; 2-Nap, Si-CH$_3$), −2.33 (2-Ph; 2-Nap, Si-CH$_3$), −2.46 (3-Ph; 1-Nap, Si-CH ), −2.59 (4-Ph; O-Nap, Si-CH$_3$) ppm.

TABLE I

NMR Analysis of Mixed Phthalocyanine-Naphthalocyanine Silicon Metallated Ring Systems
Si(BPc)(OSi(CH$_3$)$_2$C$_{18}$H$_{37}$)$_2$ (C$_6$D$_5$CD$_3$)

| Number of Rings | | Shift of SiCH$_3$ | Content* |
|---|---|---|---|
| Phthalo | Naphthalo | (ppm) | (%) |
| 0 | 4 | −2.10 | 9.60 |
| 1 | 3 | −2.20 | 25.16 |
| 2 | 2 | −2.31 | 25.47 |
| 2 | 2 | −2.33 | 12.44 |
| 3 | 1 | −2.46 | 21.54 |
| 4 | 0 | −2.59 | 5.79 |

*By integration of SiCH$_3$ resonance.

EXAMPLE II

This Example illustrates the preparation of phthalo/-naphthalocyanine dye mixtures with a 1:3 mole ratio of isoindoline reactants in accordance with the present invention.

A. Dichlorosilicon benzophthalocyanine

A mixture of 1,3-diiminoisoindoline (0.878 g, 6.05 mmoles), 1,3-diiminobenz(f)isoindoline (3.463 g, 17.74 mmoles), silicon tetrachloride (2.76 ml, 24.11 mmoles) and azeotropically distilled quinoline (100 ml) is refluxed for 1.5 hours The reaction medium suspension is cooled and filtered to separate the solid phase. After washing with methanol and vacuum drying, a 3.276 g yield of a green solid is obtained, which gives a positive Beilstein test.

B. Dihydroxysilicon benzophthalocyanine

In the manner previously described, a mixture of dichlorosilicon benzophthalocyanine (1:3 mole ratio) (3.276 g) and concentrated sulfuric acid (50 ml) is stirred at room temperature for 3 hours. The reaction medium is poured onto ice, and the resulting suspension is filtered, and the separated solid is washed with water and then dried.

The recovered solid is mixed with pyridine (50 ml) and concentrated ammonium hydroxide (5 ml), and the mixture is refluxed for 1.5 hours. The resulting suspension is filtered, and the isolated solid is washed with methanol and then dried to yield 6.089 g of a bright green product which gives a negative Beilstein test for halogen.

C. Bis(dimethyloctadecylsiloxy)silicon benzophthalocyanine (1:3 mole ratio)

A mixture of dihydroxysilicon benzophthalocyanine (1:3 mole ratio) (6.0 g), dimethyloctadecylchlorosilane (15.2 g), tributylamine (5 ml), and azeotropically distilled 3-picoline (100 ml) is refluxed for 4 hours. In the manner previously described, a solid product (9.959 g) is obtained.

A portion of the product (3.54 g) is purified by column chromatography [alumina III, dry loaded (alumina V), hexanes-toluene 4:1], and vacuum dried for 14 hours at room temperature to yield 70 mg of product. The product is characterized by IR, UV-VIS-NIR and NMR data similar to the product of Example I(C).

Figure 2:
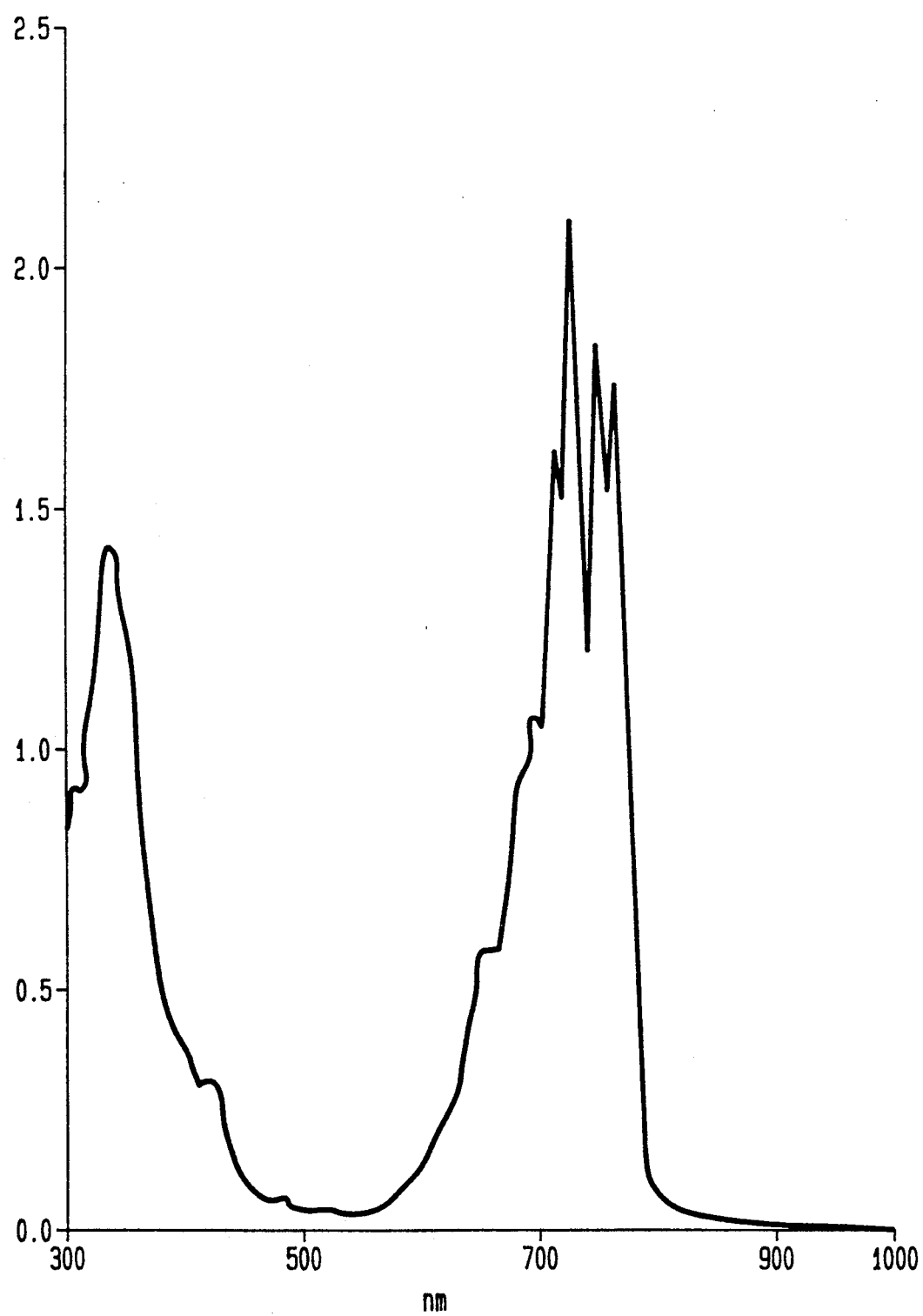

FIG. 2 is a UV-VIS-NIR spectrum of the bis(dimethyloctadecylsiloxy)silicon benzophthalocyanine product (1:3 mole ratio).

Table II summarizes a NMR spectrum of the purified product.

TABLE II

NMR Analysis of Mixed Phthalocyanine-Naphthalocyanine Silicon Metallated Ring Systems
$Si(BPc)(OSi(CH_3)_2C_{18}H_{37})_2 \ (C_6D_5CD_3)$

| Number of Rings | | Shift of $SiCH_3$ | Content* |
|---|---|---|---|
| Phthalo | Naphthalo | (ppm) | (%) |
| 0 | 4 | −2.10 | 20.84 |
| 1 | 3 | −2.20 | 40.40 |
| 2 | 2 | −2.31 | 17.77 |
| 2 | 2 | −2.33 | 10.12 |
| 3 | 1 | −2.46 | 5.86 |
| 4 | 0 | −2.59 | — |

*By integration of $SiCH_3$ resonance.

What is claimed is:

1. A thin film optical medium comprising a mixture of tetraazaporphyrin dye constituents which exhibits light absorption over a spectrum range of about 660–850 nm, and which dye constituents have different structures respectively corresponding to the formula:

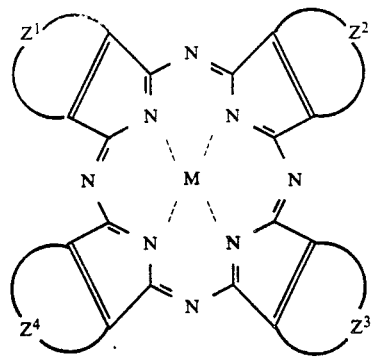

where M is a coordinated silicon or metal containing group, and wherein in one dye constituent $Z^1$, $Z^2$, and $Z^3$ are each a benzo structure represented by the formula:

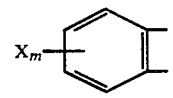

and $Z^4$ is a naphthalo structure that is represented by the formula:

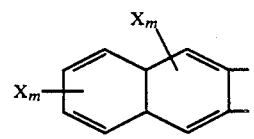

in another dye constituent $Z^1$ and $Z^2$ are each a benzo structure as above, and $Z^3$ and $Z^4$ are each a naphthalo structure as above; in another dye constituent $Z^1$ and $Z^3$ are each a benzo structure as above and $Z^2$ and $Z^4$ are each a naphthalo structure as above; in another dye constituent $Z^1$ is a benzo structure as above, and $Z^2$, $Z^3$ and $Z^4$ are each a naphthalo structure as above, X being hydrogen, halogen, or an aliphatic, alicyclic or aromatic substituent containing 1–12 carbon atoms, and m being an integer with a value of 1–2.

2. A thin film optical medium comprising a mixture of tetraazaporphyrin dye constituents which exhibits light absorption over a spectrum range of about 660–850 nm, and which dye constituents have different structures respectively corresponding to the formula:

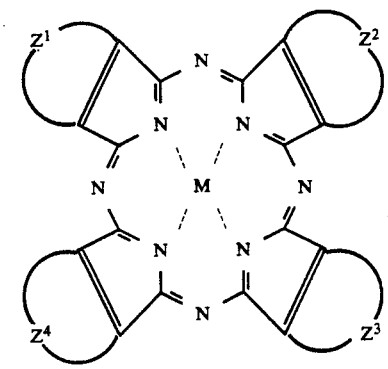

where M is a coordinated silicon or metal containing group, and wherein in one dye constituent $Z^1$, $Z^2$, and $Z^3$ are each a benzo structure represented by the formula:

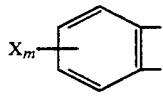

and $Z^4$ is an anthracene structure that is represented by the formula:

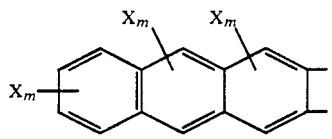

in another dye constituent $Z^1$ and $Z^2$ are each a benzo structure as above, and $Z^3$ and $Z^4$ are each an anthracene structure as above; in another dye constituent $Z^1$ and $Z^3$ are each a benzo structure as above and $Z^2$ and $Z^4$ are each an anthracene structure as above; in another dye constituent $Z^1$ is a benzo structure as above, and $Z^2$, $Z^3$ and $Z^4$ are each an anthracene structure as above, X being hydrogen, halogen, or an aliphatic, alicyclic or aromatic substituent containing 1-12 carbon atoms, and m being an integer with a value of 1-2.

3. A thin film optical medium comprising a mixture of tetraazaporphyrin dye constituents which exhibits light absorption over a spectrum range of about 660-850 nm, and which dye constituents have different structures respectively corresponding to the formula:

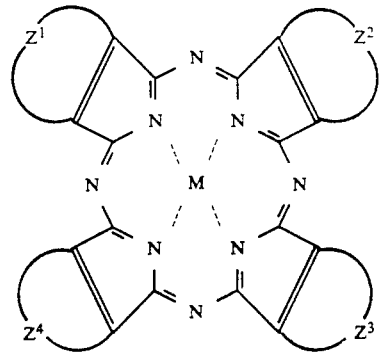

where M is a coordinated silicon or metal containing group, and wherein in one dye constituent $Z^1$, $Z^2$, and $Z^3$ are each an anthracene structure represented by the formula:

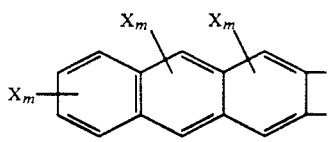

and $Z^4$ is a naphthalo structure that is represented by the formula:

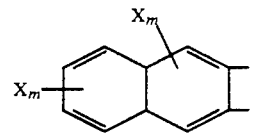

in another dye constituent $Z^1$ and $Z^2$ are each an anthracene structure as above, and $Z^3$ and $Z^4$ are each a naphthalo structure as above; in another dye constituent $Z^1$ and $Z^3$ are each an anthracene structure as above and $Z^2$ and $Z^4$ are each a naphthalo structure as above; in another dye constituent $Z^1$ is an anthracene structure as above, and $Z^2$, $Z^3$ and $Z^4$ are each a naphthalo structure as above, X being hydrogen, halogen, or an aliphatic, alicyclic or aromatic substituent containing 1-12 carbon atoms, and m being an integer with a value of 1-2.

4. An optical medium in accordance with claim 1 which has an external field-induced noncentrosymmetric molecular orientation, and which exhibits second order nonlinear optical susceptibility $X^{(2)}$.

5. An optical medium in accordance with claim 2 which has an external field-induced noncentrosymmetric molecular orientation, and which exhibits second order nonlinear optical susceptibility $X^{(2)}$.

6. An optical medium in accordance with claim 3 which has an external field-induced noncentrosymmetric molecular orientation, and which exhibits second order nonlinear optical susceptibility $X^{(2)}$.

* * * * *